United States Patent [19]
Yamashita et al.

[11] Patent Number: 5,584,916
[45] Date of Patent: Dec. 17, 1996

[54] ORGANIC-SOLVENT VAPOR ADSORBING APPARATUS

[75] Inventors: Katsuhiro Yamashita, Yokohama; Takashi Taniguchi, Kawasaki, both of Japan

[73] Assignee: Nichias Corporation, Tokyo, Japan

[21] Appl. No.: 303,195

[22] Filed: Sep. 8, 1994

[30] Foreign Application Priority Data

Sep. 8, 1993 [JP] Japan .................. 5-246126

[51] Int. Cl.$^6$ .................. B01D 53/06
[52] U.S. Cl. .................. 96/123; 96/125; 96/130; 96/144; 96/150
[58] Field of Search .................. 96/121, 123, 125–128, 96/130, 150

[56] References Cited

U.S. PATENT DOCUMENTS

| | | | |
|---|---|---|---|
| 2,993,563 | 7/1961 | Munters et al. | 96/125 X |
| 3,176,446 | 4/1965 | Siggelin | 96/125 X |
| 3,619,987 | 11/1971 | Colvin et al. | 96/125 X |
| 3,844,737 | 10/1974 | Macriss et al. | 96/126 X |
| 4,012,206 | 3/1977 | Macriss et al. | 96/125 X |
| 4,134,743 | 1/1979 | Macriss et al. | 96/125 X |
| 4,490,161 | 12/1984 | Ito et al. | 96/123 |
| 4,529,420 | 7/1985 | Norbäck | 96/123 |
| 4,729,774 | 3/1988 | Cohen et al. | 96/123 |
| 4,846,855 | 7/1989 | Tsujimoto | 96/123 X |
| 4,946,479 | 8/1990 | Izumo | 96/123 |
| 5,158,582 | 10/1992 | Onitsuka et al. | 96/125 X |
| 5,167,679 | 12/1992 | Maekawa et al. | 96/125 |
| 5,188,645 | 2/1993 | Fukuhori et al. | 96/125 X |
| 5,242,473 | 9/1993 | Ogasahara | 96/125 |

FOREIGN PATENT DOCUMENTS

| | | | |
|---|---|---|---|
| 0051501 | 5/1982 | European Pat. Off. | 96/125 |
| 2460401 | 7/1975 | Germany | 96/125 |
| 2729345 | 1/1978 | Germany | 96/123 |
| 56-026523 | 3/1981 | Japan | 96/126 |
| 58-008536 | 1/1983 | Japan | 96/121 |
| 2-214517 | 8/1990 | Japan | 96/125 |
| 2-241516 | 9/1990 | Japan | 96/125 |
| 5-115736 | 5/1993 | Japan | 96/125 |
| 6-000320 | 1/1994 | Japan | 96/125 |
| 6-031132 | 2/1994 | Japan | 96/125 |
| 6-063345 | 3/1994 | Japan | 96/125 |
| 2178976 | 2/1987 | United Kingdom | 96/125 |

*Primary Examiner*—Robert Spitzer
*Attorney, Agent, or Firm*—Cushman Darby & Cushman IP Group of Pillsbury Madison & Sutro LLP

[57] ABSTRACT

The present invention relates to an organic-solvent vapor adsorbing apparatus which includes a rotor containing an adsorbent and having tubular draft passages arranged in a direction of the rotational axis thereof. Plate-like separators disposed along a radial direction of the rotor define a plurality of zones. A treatment zone is provided for removing organic solvent vapor from a gaseous stream passed therethrough and into the adsorbent. A regeneration zone is also provided for removing the organic solvent from the adsorbent by a heated air stream passed therethrough. Finally, a purge zone is provided for cooling the adsorbent with cool air. Air exiting the purge zone is merged with the heated air stream which is introduced into the regeneration zone.

8 Claims, 1 Drawing Sheet

ORGANIC-SOLVENT VAPOR ADSORBING APPARATUS

BACKGROUND OF THE INVENTION

1. Field of Invention

The present invention relates generally to an organic-solvent vapor adsorbing apparatus for obtaining clean air by removing organic-solvent vapor from air which contains organic-solvent vapor.

2. Description of Related Art

In various factories, working places, and the like, where it is impossible to completely prevent an organic solvent from evaporating and diffusing into the air, it is necessary to constantly carry out forced ventilation or effect cleaning treatment by collecting air containing the organic-solvent vapor. In particular, if the amount of vaporized organic solvent is large, such cleaning treatments are indispensable for the purposes of securing worker safety and preventing the deterioration of the surrounding environment.

Various adsorbents and adsorbing apparatuses have hitherto been employed for removing organic solvents from air containing organic-solvent vapor or for collecting vaporized organic solvent. For example, International Patent Laid-Open No. 91/16971 discloses a rotary organic-solvent vapor adsorbing apparatus comprising a honeycomb-structure rotor that carries an adsorbent which displays the property of adsorbing organic-solvent vapor better than steam. This conventional apparatus is suitable for efficiently treating air containing a low concentration of organic-solvent vapor.

As shown in FIG. 1, this conventional rotary adsorbing apparatus comprises a honeycomb-structure rotor 1 in which a corrugated sheet and a noncorrugated sheet made of ceramic fibers or the like are superposed one on top of the other and are wound to form a roll. The apparatus further comprises an adsorbent which is carried in the rotor 1 and is rotated by setting the center of winding as an axis of rotation. Tubular draft passages formed by the shaped sheet extend in the longitudinal direction of the rotor 1. When air to be treated A is sent into these passages by a first blower $F_1$, the organic-solvent vapor therein is adsorbed by the adsorbent in the rotor 1, and cleaned air a is discharged from the opposite side. However, the air to be treated A is not supplied to all of the draft passages of the rotor 1. Instead, a separator 3 is disposed in the vicinity of an end face 2 where the draft passages of the rotor 1 are open (another separator is coaxially disposed on the other end face as well) to form a fan-shaped treatment zone 5 and regeneration zone 4. The air to be treated A is passed through the treatment zone 5. A second blower $F_2$ supplies regenerating heated air R along a direction opposite to the air to be treated A and into the regeneration zone 4.

As the air to be treated A is passed through the treatment zone 5, the adsorbent in the rotor 1 adsorbs organic solvent therefrom. The continuous rotational movement of the rotor 1 displaces the adsorbent and the adsorbed organic solvent therein into the regeneration zone 4. The regenerating air R heats the adsorbent while in the regeneration zone 4, thereby causing the organic solvent to be desorbed from the adsorbent. Reproduced exhaust air S containing the desorbed organic-solvent vapor is exhausted from the opposite end face of the rotor 1. In this manner, the adsorbent is constantly regenerated in the regeneration zone 4 before the rotational movement of the rotor 1 returns the adsorbent back to the treatment zone 5.

However, in the above-described conventional rotary organic-solvent vapor adsorbing apparatus, the rotor 1 and adsorbent therein possess a high temperature immediately after leaving the regeneration zone 4 and entering the treatment zone 5. The adsorbent's ability to adsorb the solvent vapor is inhibited at such high temperatures. As the rotor 1 and adsorbent therein are continuously rotated through the treatment zone 5 by the rotational movement of the rotor 1, they are eventually cooled by the air to be treated A which flows into the treatment zone 5. Unfortunately, the rate at which the air to be treated A decreases the temperature of the adsorbent is insufficient. The adsorbent only gradually begins to exhibit its adsorbing capabilities as it rotates through the treatment zone 5. For this reason, part of the solvent vapor contained in the air to be treated A passes through the treatment zone 5 without being adsorbed. The operational efficiency of the conventional apparatus is thus limited.

The present invention attempts to overcome this problem by providing an organic-solvent vapor adsorbing apparatus for removing organic-solvent vapor in air that includes a rotor in which tubular draft passages of a honeycomb-structure are arranged in a direction of a rotational axis. An adsorbent for adsorbing organic-solvent vapor is contained in the rotor. The rotor is rotated by a rotatively driving means.

A pair of separators partitions a vicinity of each of the end faces of the rotor and divides the rotor into three wedge-shaped zones. The separators are plate-like members disposed in face-to-face relation to the ends of the rotor and are axially arranged. The three wedge-shaped zones include a treatment zone, a regeneration zone, and a purge zone.

A first air-blowing means is provided for supplying air to be treated to the treatment zone. The adsorbent adsorbs the organic-solvent vapor from the supplied stream of air, so that treated air passes through the treatment zone and is discharged into the environment.

The continuous rotational movement of the rotor displaces the adsorbent and its adsorbed organic-solvent vapor into the regeneration zone. A second air-blowing means supplies regenerating heated air to the regeneration zone, heating the adsorbent and removing organic-solvent vapor therefrom.

The continuous rotational movement of the rotor then rotates the heated adsorbent into the purge zone. The adsorbent is cooled by purge air that is supplied to the purge zone. As the purge air exits the purge zone, it joins with a stream of outside air. The purge air and outside air in combination pass through an air heater located on the inlet side of the second air-blowing means and thereafter form the regeneration air.

The apparatus provided by the present invention differs from that of the above-mentioned conventional apparatus in that a third wedge-shaped purge zone is positioned intermediate the regeneration zone and the treatment zone. Further, part of the regenerating heated air is preliminarily utilized as purged air, where it is heated by the rotor and adsorbent as it passes through the purge zone.

By passing purge air through the purge zone, the temperature of the adsorbent within the rotor is decreased before it re-enters the treatment zone. Because the adsorbent entering the treatment zone is cool, the adsorbent displays a greater adsorbing capability as it enters the treatment zone. The solvent-adsorbing efficiency of the apparatus is thereby enhanced and the size of the purge zone is minimized.

SUMMARY OF THE INVENTION

It is therefore an object of the present invention to provide a rotary organic-solvent vapor adsorbing apparatus provided with a purge zone positioned intermediate a regeneration zone and a treatment zone, so that the adsorbent is sufficiently cooled by the purge zone before it enters the treatment zone, thereby increasing the operational efficiency of the apparatus so that it exhibits greater adsorbing capabilities than that of a conventional adsorbing apparatus.

It is another object of the present invention to provide a rotary organic-solvent vapor adsorbing apparatus in which the purge air P is reheated by the adsorbent as it passes through the purge zone and is then reutilized as regenerating heated air R, so that a smaller heat consumption is required than in a conventional adsorbing apparatus.

It is still another object of the present invention to provide a rotary organic-solvent vapor adsorbing apparatus in which a higher concentration of organic-solvent vapor is present in the exiting regeneration exhaust air S than in the air to be treated A.

These and other objects, features, and advantages of the present invention will become apparent from the following detailed description when taken in conjunction with the accompanying drawings which illustrate, by way of example, the principles of the invention.

BRIEF DESCRIPTION OF THE DRAWING

The accompanying drawings illustrate the invention. In such drawings.

DESCRIPTION OF THE PREFERRED EMBODIMENTS

Figure 1:
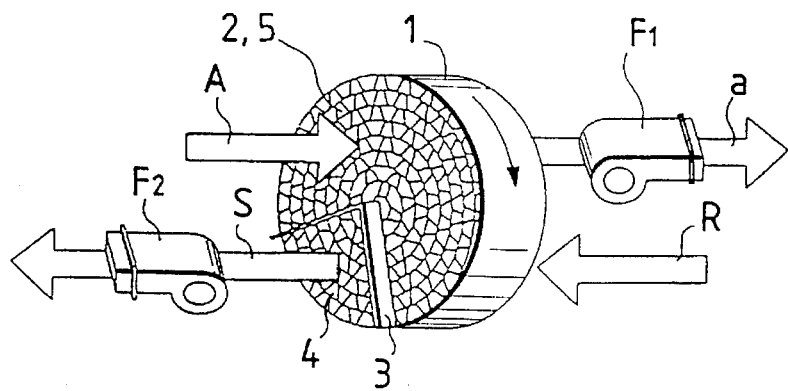
FIG. 1 is a schematic diagram illustrating a conventional rotary organic-solvent vapor adsorbing apparatus.

A detailed description of the present invention is provided below.

As shown in the accompanying drawings, preferred embodiments of a rotary organic-solvent vapor adsorbing apparatus in accordance with the present invention are designated generally by the reference numeral 10.

Figure 2:
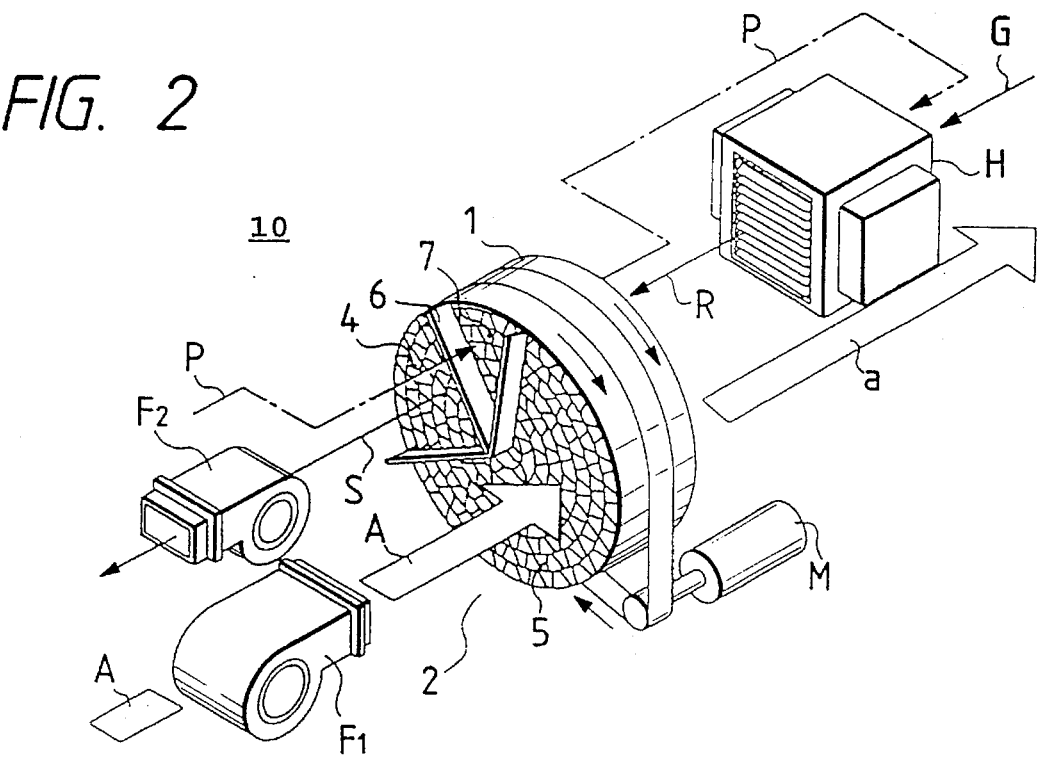
FIG. 2 is a schematic diagram illustrating a rotary organic-solvent vapor adsorbing apparatus according to an embodiment of the present invention.

As shown in FIG. 2, a synthetic zeolite adsorbent is carried in a honeycomb structure rotor 1 in which tubular draft passages honeycomb-structure are arranged in a direction of a rotational axis of the rotor 1. The rotor 1 is driven by a motor M. A separator 6 is disposed in the vicinity of an end face 2 of the rotor 1. The separator 6 partitions the area located in the vicinity of the end face 2 into three fan-shaped zones. The separator 6 consists of plate-like members disposed in face-to-face relation to the ends of the rotor 1 and are axially aligned. Consequently, a treatment zone 5, a regeneration zone 4, and a purge zone 7 are formed.

A first blower $F_1$ supplies air to be treated A to the treatment zone 5. A second blower $F_2$ supplies regenerating air R heated by a heater H to the regeneration zone 4. The air to be treated A and regenerating air R flow through the rotor 1 in opposite directions. The separator 6 prevents the mixing of air to be treated A with regenerating air R. This arrangement is similar to that of a conventional rotary organic-solvent vapor apparatus as shown in FIG. 1.

However, unlike the conventional apparatus, according to the arrangement provided by the present invention purge air P (i.e., fresh outside air) for cooling the rotor is supplied to the purge zone 7. After passing through the purge zone 7, the purge air P joins with outside air G. The purge air P and the outside air G in combination then flow into an inlet port of heater H. The purge air P and outside air G collectively exit the heater as heated regeneration air R, which then enters the regeneration zone 4.

As shown in FIG. 1, the conventional apparatus does not contain a purge zone for accepting purge air P. Instead, a separator 3 divides the area located in the vicinity of the end face 2 into only two fan-shaped zones. Consequently, only the treatment zone 5 and the regeneration zone 4 are formed; there is no purge zone 7 formed in the conventional apparatus.

The adsorption and desorption of the vapor organic solvent by the adsorbent is now described in greater detail with reference to FIG. 2. When the rotor 1 is continuously rotated by the motor M, and the blowers $F_1$ and $F_2$ are operational, the air to be treated A flows through the draft passages of the rotor 1 in the treatment zone 5. As the air to be treated A flows through the treatment zone 5, the organic solvent contained therein is adsorbed by the adsorbent. The continuous rotational movement of the rotor 1 displaces the adsorbent which has adsorbed the organic solvent to the regeneration zone 4, where the adsorbent is heated by the high temperature regenerating air R. The heat from the regeneration air R desorbs the organic solvent from the adsorbent. The desorbed organic solvent enters the regeneration air R, and exits the rotor 1 as a stream of regeneration exhaust air S.

The continuous rotational movement of the rotor 1 carries the adsorbent from the regeneration zone 4 to the purge zone 7. When entering the purge zone 7, the adsorbent maintains the high desorption temperature which it achieved by being heated in the regeneration zone 4. However, the purge air P cools the high temperature adsorbent while it passes through the purge zone 7.

Finally, the continuous rotational movement of the rotor 1 returns the cooled adsorbent back to the treatment zone 5, where the adsorbent begins a new cycle, adsorbing the organic solvent in the air to be treated A.

The temperature of the purge air P increases as it passes through the purge zone 7 by the quantity of heat transmitted from the adsorbent. As the purge air P leaves the purge zone 7, it combines with a stream of outside air G. The purge air P and outside air G then enter the heater H. The outside air G and the purge air H collectively are heated and converted into the regenerating air R, which is then used to heat the adsorbent and organic solvent in the regenerating zone 4.

By providing the purge zone 7 in a position intermediate the regeneration zone 4 and the treatment zone 5, the adsorbent is sufficiently cooled by the purge zone 7 before it enters the treatment zone 5. Because the adsorbent entering the treatment zone 5 is cool, the adsorbent displays a greater adsorbing capability as it enters the treatment zone 5. The adsorbent is therefore able to operate at a higher efficiency in its adsorbing capabilities, and the size of the purge zone 7 can be minimized.

In addition, because the purge air P, which is heated by the adsorbent as it passes through the purge zone 7, is reutilized as heated regenerating air R, less heat is required from heater H to heat the regenerating air R. Thus, the apparatus according to the present invention operates with a smaller overall heat consumption.

It is desirable that the purge air P consists of cool, clean outside air. Low temperature outside air has high rotor-cooling capabilities. It is possible to have the purge air P consist in part of treated air; however, since the temperature of the treated air has risen while passing through the rotor 1, such a use of the treated air would cause the treating capabilities of the apparatus to decline even though the arrangement may have advantageous benefits with respect to requiring a smaller heat consumption.

In the organic-solvent vapor adsorbing apparatus according to the present invention, the organic solvent adsorbed by the adsorbent in the treatment zone 5 is desorbed in the regeneration zone 4 by a flow rate of regeneration air R that is smaller than the flow rate of the air to be treated A. This difference in air flow rates causes the regenerated exhaust air S to contain a higher concentration of organic-solvent vapor than that of the air to be treated A. The concentration rate X of organic-solvent vapor by adsorption and desorption in the apparatus is determined by a ratio between a flow rate V of air to be treated A over a flow rate v of regenerating air R (i.e., $X=V/v$). The apparatus operating conditions are generally selected in such a manner that the concentration rate X approximately equals 5 to 15.

The suitable sizes of the regeneration zone 4 and the purge zone 7 in the adsorbing apparatus of the present invention are determined by several factors, including the type and concentration of the organic solvent contained in the air to be treated A, the adsorbing and desorbing characteristics of the adsorbent used, the desired concentration rate X, the rotational speed of the rotor, and the like. Generally, the regeneration zone 4 constitutes from $1/10$ to $1/6$ of the total area of the rotor 1 as viewed with respect to an end face 2 of the rotor 1. The purge zone 7 constitutes approximately the same size as that of the regeneration zone 4 or about $1/2$ thereof.

The regeneration exhaust air S containing the organic-solvent vapor at a high concentration and emitted from the regeneration zone 4 may be disposed of by any arbitrary method, including, among others, the following: (1) a method in which the regenerated exhaust air S is sent to a condenser to condense the organic solvent; (2) a method in which the regenerated exhaust air S is sent to a combustion apparatus to burn the organic solvent; and (3) a method in which the regenerated exhaust air S is sent to a catalytic reaction apparatus to subject the organic solvent to decomposition by oxidation.

The adsorbent selected for the adsorbing apparatus of the present invention depends upon the type of organic solvent contained in the air to be treated A, but is not so limited. For example, an inorganic substance, such as a synthetic zeolite, is preferable since it has no risk of igniting even if it is regenerated in high-temperature heated air. A synthetic zeolite having a high $SiO_2/Al_2O_3$ ratio is particularly preferable since it selectively adsorbs organic-solvent vapor without adsorbing steam even if wet air is treated.

Although the present invention has been described in detail with reference to its presently preferred embodiment, it will be understood by those of ordinary skill in the art that various modifications and improvements to the present invention are believed to be apparent to one skilled in the art. Accordingly, no limitation upon the invention is intended, except as set forth in the appended claims.

What is claimed is:

1. An organic-solvent vapor adsorbing apparatus comprising:

a rotor having end faces, a rotational axis, and draft passages which are arranged in a direction of said rotational axis and which define a honeycomb structure;

an adsorbent for adsorbing organic-solvent vapor, said adsorbent being contained in said rotor;

a rotatively driving mechanism for imparting rotational movement to said rotor;

separators for partitioning each of said end faces of said rotor into a plurality of regions, including:

a treatment region which is constructed and arranged to receive air to be treated and to discharge treated air;

a regeneration region which is constructed and arranged to receive regenerating heated air, to supply said regenerating heated air to said adsorbent for removing organic-solvent vapor from said adsorbent, and to discharge said regenerating heated air; and a purge region which is constructed and arranged to receive purged air for cooling said adsorbent and to discharge said purged air; and means for supplying said purged air discharged from said purge region into said regeneration region, wherein said treatment region, said regeneration region, and said purge region are arranged sequentially in a direction of the rotational movement of said rotor.

2. An organic-solvent vapor adsorbing apparatus as recited in claim 1, wherein said separators are arranged radially so that said treatment region, said regeneration region, and said purge region are wedge-shaped.

3. An organic-solvent vapor adsorbing apparatus as recited in claim 1 or 2, further comprising an air heater for heating regenerating heated air which is supplied to said regeneration region.

4. An organic-solvent vapor adsorbing apparatus as recited in claim 1 or 2, wherein said purged air is joined with a stream of outside air before being supplied into said regeneration region.

5. An organic-solvent vapor adsorbing apparatus as recited in claim 1 or 2, wherein said apparatus has a concentration rate of between 5 and 15.

6. An organic-solvent vapor adsorbing apparatus as recited in claim 1 or 2, wherein said regeneration region constitutes an area ratio between $1/10$ and $1/6$ of said rotor.

7. An organic-solvent vapor adsorbing apparatus as recited in claim 6, wherein an area ratio of said purge region to said regeneration region is between $1/2$ and 1.

8. An organic-solvent vapor adsorbing apparatus as recited in claim 1 or 2, wherein said adsorbent is a synthetic zeolite.

* * * * *